Sept. 29, 1953     E. D. GREGORY ET AL     2,653,869
MANUFACTURE OF DUCTILE VANADIUM
Filed Jan. 12, 1950     2 Sheets-Sheet 1
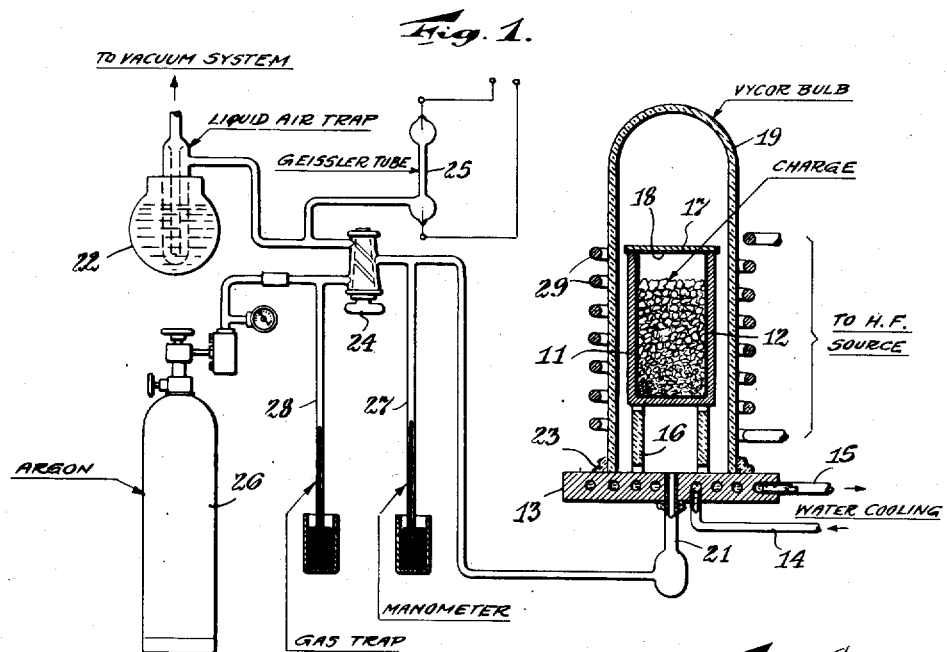
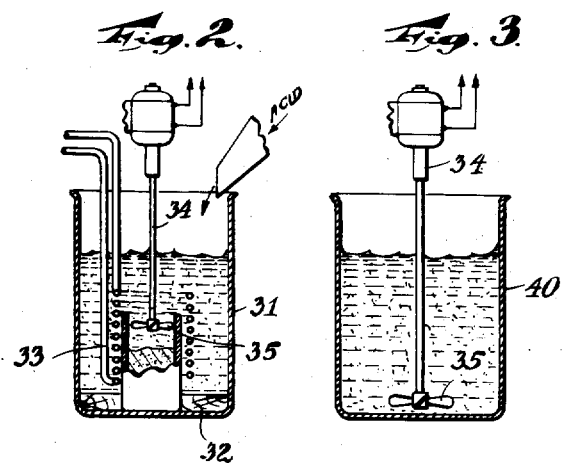
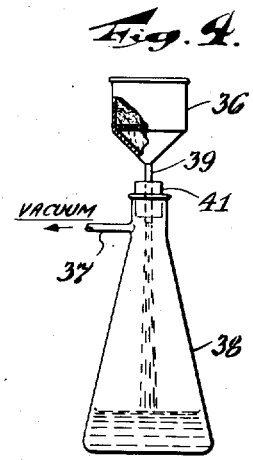
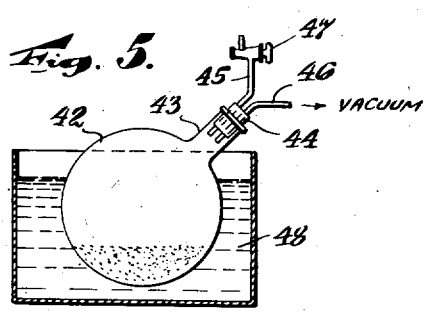
WITNESS:
Towson Price
INVENTORS
E. D. GREGORY
W. C. LILLIENDAHL
D. M. WROUGHTON.
BY
ATTORNEY

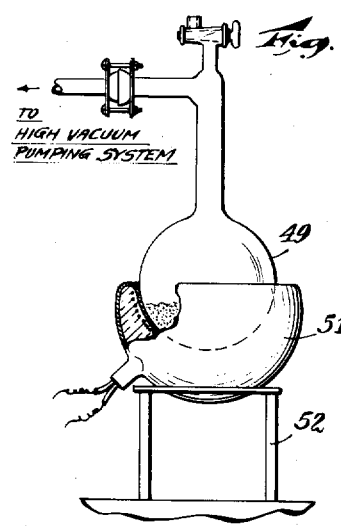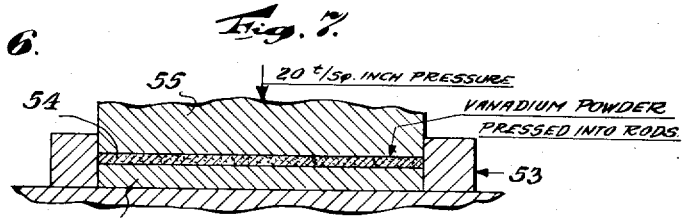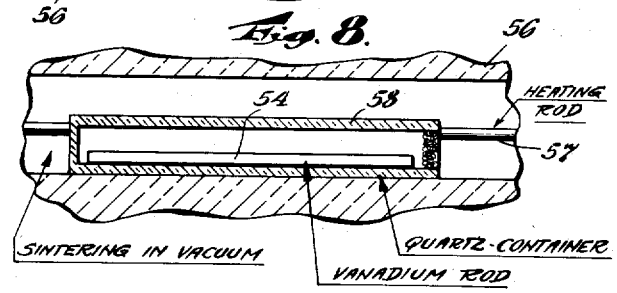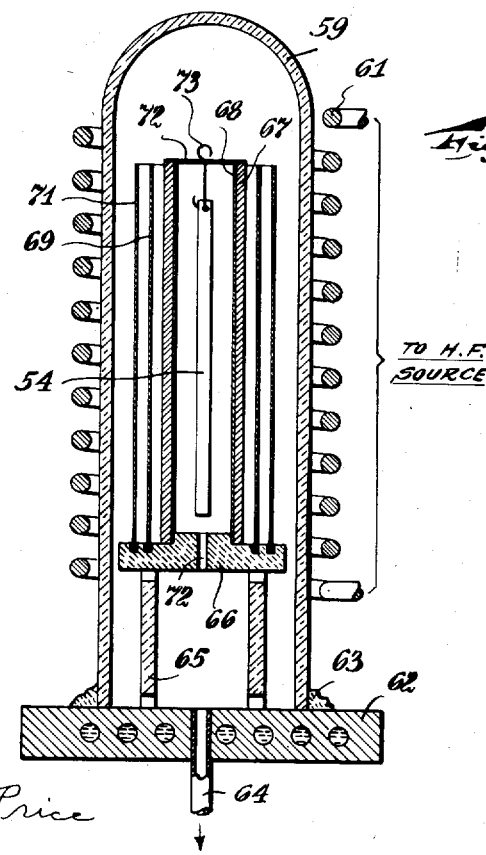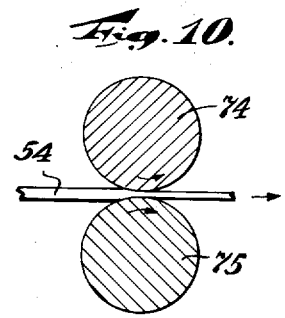

Patented Sept. 29, 1953

2,653,869

UNITED STATES PATENT OFFICE 2,653,869

MANUFACTURE OF DUCTILE VANADIUM

Edward D. Gregory, Rochelle Park, William C. Lilliendahl, Mountain Lakes, and Donald M. Wroughton, Livingston, N. J., assignors to Westinghouse Electric Corporation, East Pittsburgh, Pa., a corporation of Pennsylvania Application January 12, 1950, Serial No. 138,124

3 Claims. (Cl. 75—84)

This invention relates to vanadium, more particularly to the production of metal of an exceptionally high degree of purity, and to an improved method for the manufacture thereof.

The principal object of our invention, generally considered, is to produce vanadium by reaction of a low valence compound thereof with calcium or magnesium, said reaction taking place in a cup enclosed in a container, said container being filled with an inert gas as distinguished from the prior practice of reducing vanadic oxide in a heavy-walled iron bomb with a ground-in stopper, said bomb being heated in open air.

Another object of our invention is to produce vanadium powder by heating a vanadous or hypovanadous compound mixed with calcium and/or magnesium and the chloride of one or a mixture of said metals, by high-frequency induction, the reaction cup being enclosed in a quartz or glass bell jar, that is one of 96% silica glass, sometimes designated by the Corning trade-mark "Vycor."

A further object of our invention is to treat the powder, produced in accordance with the above, to consolidate it into coherent metal and to form to the desired shape.

Other objects and advantages of the invention will become apparent as the description proceeds.

Referring to the drawing:

Figure 1 is a diagrammatic view, with parts in section, of apparatus for producing vanadium in powder form.

Figure 2 is a vertical sectional view of apparatus for leaching the contents of the cup used in the reduction of a vanadium compound, to remove the vanadium produced therein.

Figure 3 is a vertical sectional view of apparatus for washing the vanadium powder produced.

Figure 4 is an elevational view of apparatus, with parts in vertical section, illustrating how the powder produced may be washed and dried.

Figure 5 is a vertical sectional view, with parts in elevation, of apparatus for completing the drying of the powder.

Figure 6 is an elevational view, partly in section, of apparatus for removing gas from the powder.

Figure 7 is a vertical sectional view, with a part in elevation, of apparatus for producing slugs from vanadium powder.

Figure 8 is a vertical sectional view of a furnace which may be used for subjecting such slugs to a mild sintering treatment.

Figure 9 is a vertical sectional view of apparatus for giving such slugs a high temperature sintering.

Figure 10 is a vertical sectional view of rolls which may be employed for forming the produced vanadium into sheet.

The reduction by calcium of vanadium pentoxide, has previously been accomplished in heavy-walled iron bombs, with a ground-in stopper held in place by a screw cap. Such devices have a number of limitations and disadvantages, to wit:

It is difficult to maintain an air-tight joint between the stopper and bomb and to prevent reoxidation of the vanadium powder produced as the bomb cools, or during the heating process. Considerable warping of the bomb occurs during heating and cooling, thus necessitating time-consuming lapping operations between runs. The construction of bombs has been limited to materials which will resist oxidation at elevated temperatures, and iron or iron alloys have been generally used for economy. Bombs were without exception of heavy-walled construction to permit sufficient surface area for sealing and presumably to withstand pressure produced in the reaction.

From thermo-chemical data and a consideration of the products formed in the reaction between vanadium trioxide (or lower valence oxide, such as the dioxide, $V_2O_2$) which we have substituted for the pentoxide, previously employed, and calcium, we concluded that the pressures developed in the reaction were insufficient to necessitate the heavy-walled bombs previously used. We tested our conclusions by placing an iron cup, lined with non-reactive refractory material such as CaO or MgO under a "Vycor" (or quartz) bell jar, evacuating the bell jar, and then heating the cup by high frequency induction to cause the calcium to reduce the vanadium oxide. Vaporization of the calcium was suppressed by filling the jar with argon gas at a pressure slightly less than atmospheric. There was no abnormal pressure produced during the reaction, very little vaporization of calcium, and satisfactory vanadium metal powder was obtained.

The reduction of vanadium pentoxide by calcium is old in the prior art. However, the vanadium so produced, contained substantial quantities of metallic beads, apparently formed from fused metal. Although some of the individual beads were soft and ductile, others were not and the mixture of fine powder and fused beads when pressed and sintered yielded hard and brittle metal compacts. This result has been due to the non-recognition of the importance of controlling both the amount of calcium present and the temperature of the reaction during reduction, as embodied in the present specification, that is, using from 50% to 150% calcium in excess, over the theoretical required in the reaction, together with calcium chloride, to control localized high-temperatures during the reaction.

The invention to be disclosed, therefore, differs from prior practice in the following respects and obviates several limitations of former practice. The heating, reaction, and cooling of the charge is carried out under known and reproducible conditions of gas filling and exhaust. The reaction is carried out in a vessel or cup of relatively thin wall. Oxidation of the cup is entirely prevented by working in an atmosphere of inert gas such as argon, helium, etc. A choice of several materials of construction for the cup may be made, the only limitation being the melting point and chemical activity of the material with vanadium and calcium (or magnesium, if used), at elevated temperatures. Thus the cup may be made of a high melting point but easily oxidizable metal such as molybdenum, which permits the reduction to be made at temperatures at least up to 1400° C. or higher.

Specifically, the invention relates to the preparation of non-pyrophoric vanadium powder of a high degree of purity, and to the sintering and working of such powder into articles of the desired size and shape.

In general, the method involves reduction of a compound of vanadium such as the dioxide, the trioxide, or other hypo-vanadous or vanadous compound containing only material eliminated without harm to the resulting metal, during the process of reduction, with calcium or other alkaline earth metal under controlled conditions of exhaust and gas filling with an inert gas such as argon or helium. After reduction, the metallic vanadium in powder form is recovered by leaching the charge with dilute acid, water, and the powder is finally washed with alcohol, ether, and dried and degassed in vacuo at a temperature between 300° and 400° C. Articles are then formed from the powder by pressing, sintering, rolling, and/or machined to the final form desired. The advantages of the method will become apparent as the description proceeds.

The procedure to be described may be applied to either the dioxide, trioxide, or any relatively non-volatile vanadium compound in which the vanadium has a valence of not more than three, provided that it is reducible by calcium or magnesium, leaving no harmful contaminant, and that the end products of the reaction may be leached or dissolved by acids which will not react with vanadium. In practice we prefer to use the dioxide or the trioxide because it is not hygroscopic, has an extremely low vapor pressure at temperature of the reaction, and the reaction is less exothermic than when using the pentoxide or other vanadic or hypo-vanadic compound.

In the Rentschler et al. Patent No. 2,446,062, dated July 27, 1948, Manufacture of Thorium, details are presented for the production of metal powder by mixing thorium oxide and calcium, placing the charge in a molybdenum container, and heating said container to a sufficiently high temperature to cause reduction of the oxide to metal. The heating is with a high-frequency coil, the container is hermetically sealed with a "Vycor" jar closed at one end, and the reduction takes place in an inert gas such as argon under controlled pressure. The apparatus used for vanadium reduction is identical with that used for thorium, with certain modifications with respect to the charge which will now be discussed.

The reaction between calcium and vanadium pentoxide is very exothermic and, with no calcium chloride, proceeds with almost explosive violence when the mixture is heated to about 700° C. The reaction mass attains extremely high temperatures because of the high heat of reaction. With the pentoxide and calcium and even moderate quantities of calcium chloride, high localized temperatures are developed which explains the fused beads obtained by Marden and Rich in accordance with their Patent No. 1,814,720. It became apparent that these localized high temperatures must be controlled to produce a uniformly good product. We have found that for the reduction of $V_2O_5$ by calcium in an open cup, it is necessary to use an excess of calcium and about five moles of $CaCl_2$ per mole of $V_2O_5$ in order to hold the reaction temperature down to suitable limits. The patent of Marden and Rich (1,814,720) is not specific on this point and their publication (Ind. Eng. Chem. 19,786 (1927)) while mentioning a $V_2O_5/CaCl_2$ molar ratio of 1/5 actually specifies a ratio of 1/2.8. This low ratio however results in the formation of coarse aggregate and fused beads, undesirable products as shown below.

We have found that the heat of reaction and therefore the maximum temperature can be better controlled by employing the oxide of vanadium, or other compound thereof, in which the valence of the vanadium is less than four, together with the addition of carefully dehydrated calcium chloride or magnesium chloride to the charge of oxide and calcium and/or magnesium. By reducing the heat of the reaction by using a lower valence compound of vanadium and by diluting the charge with calcium chloride, we have been able to produce consistently a non-pyrophoric vanadium powder substantially all of which is usable for the production of coherent ductile vanadium by the powder metallurgy processes to be described.

To illustrate the importance of preventing high point temperatures within the reaction mass, a batch of powder produced as described using molar ratios $V_2O_3/Ca/CaCl_2$ of 1/6/0.9, after drying and degassing, was separated into particle size fractions using standard screens in a manner well known to the art. Each of these fractions was then sampled and analyzed for vanadium metal content. The following data were obtained:

| Particle Size Fraction | Percent of Total Powder | Percent Metallic V |
| --- | --- | --- |
| +48 mesh | 3 | 85.7 |
| −48+100 mesh | 3.5 | 87.1 |
| −100+150 mesh | 3.5 | 94.3 |
| −150+325 mesh | 29 | 99.2 |
| −325 mesh | 61 | 98.9 |

The coarser fractions contained a large proportion of fused beads, such as produced by Marden and Rich, together with some aggregates. Thus it is obvious that operating under conditions which yield a high percentage of beads or coarse particles will produce a poor metal or will result in a low yield if the coarse particles are removed, whereas our process produced a powder of which a high percentage (90% in the above example) is of high purity and usable for the production of workable solid metal.

The vanadous or hypo-vanadous oxide, or other compound of vanadium to be employed, in which the valence of vanadium is not more than three, may be prepared, if not procurable by purchase, from pure vanadium pentoxide, ammonium metavanadate, NH$_4$VO$_3$, or other vanadic compound containing no harmful constituent, by hydrogen reduction at 500° C. to 1000° C., as in a metal or ceramic boat in a refractory tube furnace.

In our improved process, the preferred charge is prepared by mixing V$_2$O$_3$, Ca, and CaCl$_2$ in the molar proportions 1:6:1. This represents a 100% excess of Ca according to the reaction:

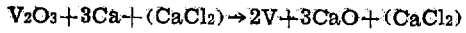

$$V_2O_3 + 3Ca + (CaCl_2) \rightarrow 2V + 3CaO + (CaCl_2)$$

The ratio of CaCl$_2$ to V$_2$O$_3$ can be varied between 0.7 and 1.5. Below 0.7 the reaction is too violent for operation in an unsealed vessel while above 1.5 the product is a pyrophoric or very fine powder.

The charge is placed in an iron, molybdenum or other high melting metal cup, preferably one which has been lined with MgO, CaO, or other non-reactive refractory material.

The cup is supported inside a "Vycor" or ceramic bottle mounted on a vacuum plate similar to that shown in the thorium patent noted above. After air is removed by pumping or sweeping, argon or other inert gas is admitted up to about 0.8 of an atmosphere, and the cup is heated. The pressure is maintained at about 0.8 of an atmosphere throughout the reaction, and the cup temperature, as read with an optical pyrometer on the side through the bottle, is held between 900° C. and 1350° C. for a period of twenty minutes to 1½ hours.

In Figure 1 there is shown apparatus for effecting the reduction of vanadium trioxide or other reducible low valence vanadium compounds with relatively low vapor pressures, to metal. This involves a container, cup or crucible 11 formed of a suitable metal, relatively inert to vanadium at elevated temperatures, such as iron, steel, or molybdenum, and preferably provided with a lining 12 of a non-reactive, refractory oxide, such as CaO and/or MgO. However, if vanadium of a very low iron content is desired, molybdenum or its equivalent must be used. The cup is supported above a metal plate 13 which is preferably cooled by circulating water therethrough by means of inlet pipe 14 and outlet pipe 15. The cup preferably rests on a hollow refractory insulator 16. A mixture of vanadium trioxide of high purity, as specified above, and ground to pass a 100 mesh sieve, calcium metal of highest purity with respect to deleterious elements such as nitrogen and metals which alloy with vanadium, cut to pass ⅛" wire screening, and dehydrated calcium chloride, which should not contain over 0.5% water, ground to a powder, is placed in the cup. A preferred mixture is 320 gms. of vanadium trioxide, 512 gms. of calcium, or 311 grams of magnesium, which represents an excess of approximately 100% over that theoretically required, in accordance with the equation:

$$V_2O_3 + 3M \rightarrow 2V + 3MO$$

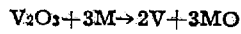

in which M represents an alkaline earth metal, which for reasons of economy would preferably be calcium, magnesium, or a mixture thereof, and 212 gms. of calcium chloride, preferably specially dehydrated to leave not more than 0.1% water, or the equivalent of pure magnesium chloride, or a mixture of these salts. This dehydration is necessary because ordinary anhydrous calcium chloride, as purchased, yields variable results. The presence of water vapor plays an important role in increasing the reaction rate, temperature, and residual calcium and/or magnesium content of the metal. This proportion is preferred, although satisfactory metal has been produced with between 50% and 150% excess of reducing metal and a molar ratio of CaCl$_2$ to V$_2$O$_3$ between 0.7 and 1.5.

The charge is mixed for 30 minutes by tumbling to obtain a good mix and then poured into the reduction container about 4½" inside diameter, 10" deep, this size allowing some free space above the charge which is desirable. This cup may be made of either molybdenum or iron and preferably lined with a refractory material such as CaO or MgO applied by spraying or painting on a suspension of the oxide in a lacquer material such as nitrocellulose which is burned off by heating the cup in air to a temperature of about 400° C.

The container 11 is now covered, as by a plate 17 of the same or a suitable metal, preferably lined like the container, as indicated at 18 and placed under the hermetically sealed bell jar 19. The metal plate 13 is tubulated, as indicated at 21, and connected to a high vacuum exhaust system which may conveniently be comprised of a "Cenco," similar high vacuum pump, or mercury diffusion pump, and a liquid air trap 22. The bell jar 19 is just large enough to slip over the cup, and is set on the metal base and sealed vacuum tight, preferably by means of vacuum wax 23. The jar is then exhausted to a vacuum of about 50 microns or less through valve or stop cock 24.

Argon gas (99.9%) is then introduced, as from tank 26 through valve 24 to a pressure of about eight-tenths of an atmosphere. A mercury column 27 indicates this pressure. A gas trap or "blow-off" 28, comprising a mercury column, is also provided. The metal cup 11 is then slowly heated to between 900° and 1350° C. and maintained at that temperature for a period of from twenty to ninety minutes, by energizing the coil 29 to melt the reducing metal and diluting chloride flux, and reduce the oxide to metal powder. During the heating, small changes in pressure occur and it is advisable to maintain a positive pressure on the "Vycor" bell jar by pumping off sufficient gas from time to time, to hold a final pressure of gas of about eight-tenths of an atmosphere.

After the cup and charge have thoroughly cooled at the end of the reaction, the cup is removed and placed in a jar or receptacle 31 containing a large volume, roughly 20 liters, of cold water. While in the receptacle 31, the cup 11 is preferably centered, as by means of a block of wood 32, and cooled during the process of leaching as by means of a coil of pipe 33, preferably formed of stainless steel, through which water circulates. Acetic acid is added at this stage in slight excess over that sufficient to dissolve any reducing metal and oxide which is leached out of the cup. The mixture is preferably stirred as by means of a stainless steel motor-driven stirrer 34 provided with propeller 35.

After about 30 minutes of leaching in this manner the cooling coil is removed and the solution stirred to assist in the solution of calcium and calcium chloride. As soon as the metal powder is out of the cup, or can be removed without difficulty, the container is removed from the solution and, after settling for about one half hour, the supernatant liquid is syphoned off.

The metal powder is then washed with about 1 to 2 liters of strong acetic acid (10% to 50%)

by stirring vigorously as by means of the propeller 35 of the motor driven stirrer 34, as indicated in Figure 3, until there is no further evidence of reaction of the acid with reducing metal or oxide. This washing is preferably done in a tall vessel 40 and after settling until the supernatant liquid is almost clear or until settling is no longer proceeding at an appreciable rate, the acid is syphoned off. The powder is then washed repeatedly in the same way with water, until the supernatant liquid clears up well in about five minutes settling time. This generally requires about six washes of 1 to 2 liters each. After the last wash, the vanadium powder is filtered as in a Buchner funnel 36, illustrated in Figure 4, using suction as applied to tube 37 of flask 38. A relatively coarse filter paper is preferably used, such as Whatman #41, in the funnel, the tubulation 39 of which passes through a cork 41 in the neck of flask 38. The powder is washed with water until the filtrate is clear, and then with alcohol and ether in succession.

The metal powder, after removal from the Buchner funnel, is dried as in a spherical flask 42 having a neck 43 receiving a cork 44 through which tubes 45 and 46 pass, one of said tubes being connected to a vacuum pump and the other having a valve 47, as illustrated in Figure 5. Such an arrangement permits the powder to be dried under vacuum conditions. The complete removal of moisture is obtained by immersing the flask with the vacuum on in water 48 at 60° C. to 70° C. and shaking the flask intermittently until such removal is noted by the absence of dusting upon shaking. For larger production a steam jacketed vacuum oven would be used.

Gases are removed from the metal powder produced by heating in a suitable container 49 attached to a high-speed pumping system, as illustrated in Figure 6. While removing such gases, the temperature is raised to between 300° and 400° C. at a rate which will allow the pumping system to maintain a good vacuum, desirably by means of an electric heater 51 supported on a stand 52.

Vanadium metal powder prepared as outlined above may be pressed into coherent buttons, rods, strips, or other forms in steel dies under hydraulic pressure, that is by placing in a die and employing a hydraulically actuated plunger to effect the desired consolidation. As an alternative, the powder may be placed in a rubber or other flexible mold, and immersed in a liquid which is subjected to the desired pressure. If the pressure reaches 20 tons per sq. in., very strong compacts may be produced. Figure 7 illustrates a press 53 in which a quantity of vanadian powder may be pressed into a rod 54, as by a plunger 55, said powder resting on a plate 56 fitting the lower end of said press 53. Pressures of about 20 tons per square inch are desirably applied.

Next the material is given a baking treatment in vacuum for 16 hours at 800°–900° C. The apparatus for effecting this operation is illustrated in Figure 8, which shows a furnace 56 adapted to hold a vacuum, and containing heating means such as the rod 57 which may carry electricity. In the furnace is a quartz container 58, in which is placed one or more of the rods or slugs 54 of pressed vanadium powder. In this furnace is obtained the desired temperature for a mild sintering treatment, as above mentioned.

The mild sintering treatment is followed by high-temperature sintering for preferably about one hour in a vacuum, using in a preferred embodiment a tantalum-lined molybdenum furnace, such as illustrated in Figure 9, where heating of the vanadium rod or rods 54 may be effected by induction to a temperature preferably between about 1400° and 1600° C., in order to densify the metal sufficiently and avoid subsequent absorption of oxygen.

Referring to Figure 9, there is illustrated a "Vycor" or other glass bottle 59 with an appropriate high-frequency coil 61 which fits over the bottle with a small amount of clearance, such as about ¼". The bottle rests on a water-cooled plate 62, to which it is sealed as by vacuum wax 63 and evacuated through a pipe 64 to a vacuum pump. Resting on the plate is an insulator 65, which in turn supports an insulating plate 66 carrying a hollow cylinder 67, desirably formed of molybdenum and lined with tantalum indicated at 68. The cylinder 67 is what is heated by induction from the coil 61. In order to conserve the heat generated, said cylinder 67 is desirably surrounded by a plurality of coaxial, spaced, polished, hollow, cylindrical molybdenum or tantalum members 69 and 71. All of said cylindrical members rest on the plate 66 which is desirably apertured as indicated at 72.

The rod or rods 54 of vanadium is or are indicated at 54 as desirably suspended from a tantalum cap plate 72 by means of a refractory wire hook 73, desirably also formed of tantalum. After the high temperature sintering, the vanadium rod is ready for being worked as by rolling or otherwise.

Figure 10 illustrates a pair of rolls 74 and 75 between which a rod 54 of vanadium is being passed in order to reduce the thickness thereof, as in rolling plates of that metal.

Initial rolling is preferably done with heavy passes, about 25% reduction in area, the metal being heated in an argon atmosphere furnace at 600° C. but rolled in air. The rolling is continued with 10% to 15% reductions in area until the metal hardens to the extent that annealing becomes necessary. The material is sufficiently annealed after heating at 900° C. for ½ hour in vacuum or inert gas. Oxide scale should be removed before annealing by sanding, or by electrolytic polishing in a concentrated $H_2SO_4$ bath.

Using $V_2O_3$ (as an example of a vanadous compound) instead of $V_2O_5$ (as an example of a vanadic compound) has the following advantages:

1. Heat of reaction is reduced by 87,800 calories per mole of vanadium oxide and the reduction, while still exothermic, may be more easily controlled.

2. Since the melting point of $V_2O_5$ is about 690° C. compared to 1970° for $V_2O_3$, the $V_2O_3$ will not melt during reduction as $V_2O_5$ probably does, but will stay uniformly dispersed throughout the charge. This produces a uniform powder of desirable particle size, instead of beads or coarse powder.

3. Since $V_2O_3$ and $V_2O_5$ have densities of 4.87 and 3.36 and vanadium contents of 68% and 56%, respectively, the ratio of the weight and the volume of the charge to the vanadium produced is more favorable, that is, smaller, when using $V_2O_3$.

4. While reduction of $V_2O_5$ requires 5 Ca/mole of oxide, the reduction $V_2O_3$ requires only 3 Ca/mole. This diminishes the quantity of calcium required and at the same time diminishes the contaminants, such as nitrogen, introduced as impurities in the calcium.

5. The particle size of the powder may be controlled by varying the quantity of calcium chloride to increase or decrease the temperature of the change during reduction. This increases the yield of usable metal.

6. The reaction may be controlled, allowing the reduction to be done in an unsealed relatively thin metal cup under an inert atmosphere, rather than a sealed bomb.

7. The net result of all these improvements is that there is a good yield of vanadium metal powder all of which can be formed into mass metal by pressing and sintering and can thereafter be fabricated into rod, sheet, wire, and other forms by rolling or other metal working methods. The fabricated product in the form of small rods (0.100" dia. or less) and thin sheet (0.050" thick or less), produced from small sintered bars, if not too severely cold worked, may be bent or formed into various shapes at room temperature. Such results have not been previously attained by any other process for producing vanadium.

Although a preferred embodiment of our invention has been described, it will be understood that modifications may be made within the spirit and scope of the appended claims.

We claim:

1. The method of manufacturing non-pyrophoric vanadium powder of an exceedingly high degree of purity, comprising mixing the trioxide thereof with about 100% excess of granulated distilled calcium and about the same molar proportion as the vanadium trioxide of dehydrated calcium chloride, placing the mixture in a cup of a high melting point metal lined with oxide inert to the charge and vanadium at elevated temperatures, supporting said cup, covering said cup with a plate of metal similarly lined, surrounding the covered cup with a gas-tight enclosure to protect it and the vanadium when produced from oxidation and make possible the employment of unusually high reaction temperatures, exhausting said enclosure to a high degree of vacuum, admitting to said enclosure to a predetermined pressure slightly less than atmospheric, a gas inert to the cup and its contents, heating said cup to a temperature between 900° and 1350° C. to effect a reaction between the vanadium trioxide and calcium and reduce the former to metal powder, while melting the calcium and calcium chloride, and maintaining said cup at a temperature for a period sufficient to complete said reduction, pumping off sufficient gas during said operation to maintain said predetermined pressure in the enclosure, cooling and removing said cup from said enclosure, washing the admixed material from the vanadium powder produced, and drying said powder.

2. The method of manufacturing vanadium comprising mixing vanadium trioxide with calcium and calcium chloride in the molar proportions of about 1 to 6 to .9, heating in an inert gas to a temperature between 900° and 1350° C. to effect a reaction between the vanadium trioxide and calcium and reduce the former, while melting the calcium and calcium chloride, and liberate free vanadium, as a powder not of overly small particle size, without too violent a reaction.

3. The method of manufacturing non-pyrophoric vanadium powder of an exceedingly high degree of purity, comprising mixing the trioxide thereof with between 50% and 150% excess of a reducing metal selected from the group consisting of calcium, magnesium and mixtures thereof, in the presence of between .7 and 1.5 moles of a chloride selected from the group consisting of chlorides of calcium, magnesium and mixtures thereof, per mole of vanadium trioxide, placing the mixture in a cup of a high melting point metal lined with oxide inert to the charge and vanadium at elevated temperatures, supporting said cup, covering said cup with a plate of metal similarly lined, surrounding the covered cup with a gas-tight enclosure to protect it and the vanadium when produced from oxidation and make possible the employment of unusually high reaction temperatures, exhausting said enclosure to a high degree of vacuum, admitting to said enclosure to a predetermined pressure slightly less than atmospheric, a gas inert to the cup and its contents, heating said cup to a temperature between 900° and 1350° C. to effect a reaction between the vanadium trioxide and the selected reducing metal and reduce the former to metal powder, while melting said reducing metal and the selected chloride, and maintaining said cup at said temperature for a period sufficient to complete said reduction, pumping off sufficient gas during said operation to maintain said predetermined pressure in the enclosure, cooling and removing said cup from said enclosure, washing the admixed material from the vanadium powder produced, and drying said powder.

EDWARD D. GREGORY.
WILLIAM C. LILLIENDAHL.
DONALD M. WROUGHTON.

References Cited in the file of this patent

UNITED STATES PATENTS

| Number | Name | Date |
|---|---|---|
| 858,329 | Beckett | June 25, 1907 |
| 1,088,909 | Kuzel et al. | Mar. 3, 1914 |
| 1,760,367 | Marden et al. | May 27, 1930 |
| 1,760,413 | Kiernan | May 27, 1930 |
| 1,814,719 | Marden et al. | July 14, 1931 |
| 1,814,720 | Marden et al. | July 14, 1931 |
| 2,242,759 | Schlecht et al. | May 20, 1941 |
| 2,446,062 | Rentschler et al. | July 27, 1948 |
| 2,537,068 | Lilliendahl | Jan. 9, 1951 |

OTHER REFERENCES

Zeitschrift fur Metallkunde, Feb. 1936, pp. 30–33, Article by By Kroll; "Verformbare seltene Metalle Vanadium, Thorium and Uran."

Industrial and Engineering Chemistry, vol. 19, Jan. 1927, pp. 97–103; July 1927, pp. 786–788.

Comprehensive Treatise on Inorganic and Theoretical Chemistry, by Mellor, vol. 9, 1929, page 725. Published by Longmans, Green & Co., N. Y.